United States Patent
Liew et al.

(10) Patent No.: US 12,224,422 B2
(45) Date of Patent: Feb. 11, 2025

(54) FABRICATION OF LITHIUM BATTERY DRY ELECTRODES

(71) Applicant: Nano and Advanced Materials Institute Limited, Hong Kong (HK)

(72) Inventors: Soon Yee Liew, Hong Kong (HK); Yong Zhu, Hong Kong (HK); Yam Chong, Hong Kong (HK); Yu Tat Tse, Hong Kong (HK); Kevin Tan, Hong Kong (HK); Shengbo Lu, Hong Kong (HK); Li Fu, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 410 days.

(21) Appl. No.: 17/530,496

(22) Filed: Nov. 19, 2021

(65) Prior Publication Data

US 2022/0173369 A1    Jun. 2, 2022

Related U.S. Application Data

(60) Provisional application No. 63/119,675, filed on Dec. 1, 2020.

(51) Int. Cl.
| | | |
|---|---|---|
| *H01M 4/04* | (2006.01) | |
| *H01M 4/139* | (2010.01) | |
| *H01M 4/58* | (2010.01) | |
| *H01M 4/587* | (2010.01) | |
| *H01M 4/62* | (2006.01) | |
| *H01M 4/66* | (2006.01) | |
| *H01M 10/0525* | (2010.01) | |

(52) U.S. Cl.
CPC ......... *H01M 4/0435* (2013.01); *H01M 4/139* (2013.01); *H01M 4/5825* (2013.01); *H01M 4/587* (2013.01); *H01M 4/622* (2013.01); *H01M 4/625* (2013.01); *H01M 4/661* (2013.01); *H01M 10/0525* (2013.01)

(58) Field of Classification Search
CPC .................................................. H01M 4/0436
See application file for complete search history.

(56) References Cited

U.S. PATENT DOCUMENTS

| | | | |
|---|---|---|---|
| 9,525,168 B2 | 12/2016 | Mitchell et al. | |
| 2003/0205835 A1* | 11/2003 | Eastin | B29C 48/395 264/211.23 |

(Continued)

*Primary Examiner* — Austin Murata
(74) *Attorney, Agent, or Firm* — Idea Intellectual Limited; Margaret A. Burke; Sam T. Yip

(57) ABSTRACT

A solventless method of making a dry electrode for an electrochemical cell is provided. A solventless electrode material mixture includes 85-99% electrode active material and from 0-10% conductive carbon additive. A polymer binder system is present from 1-15%. The polymer binder system includes one or more polymer binders. The electrode material mixture is mixed at a temperature greater than a softening point or a melting point of at least one polymer binder of the polymer binder system. The electrode material mixture is kneaded into an electrode material dough. The electrode material dough is formed into an electrode material sheet. At least a portion of the electrode material sheet is affixed to a metal current collector to form an electrode.

10 Claims, 8 Drawing Sheets

(56) References Cited

U.S. PATENT DOCUMENTS

| | | | |
|---|---|---|---|
| 2013/0228082 A1* | 9/2013 | Honjou | H01M 4/0435 492/2 |
| 2013/0236778 A1* | 9/2013 | Choi | H01M 4/622 429/211 |
| 2015/0303460 A1* | 10/2015 | Murata | H01M 4/583 556/421 |
| 2018/0175366 A1 | 6/2018 | Zheng et al. | |

* cited by examiner

FABRICATION OF LITHIUM BATTERY DRY ELECTRODES

CROSS-REFERENCE TO RELATED APPLICATION

The present application claims priority to provisional patent application 63/119,675, the disclosure of which is incorporated by reference herein.

FIELD OF THE INVENTION

The present invention relates to fabrication of lithium battery dry electrodes and, in one aspect, to roller fabrication of lithium battery dry electrodes.

BACKGROUND

Presently, lithium ion battery electrodes are fabricated using a slurry coating process. In this slurry process, the electrode materials are dispersed in a solvent in the first step to create an electrode slurry. The slurry is then coated onto metal current collectors, followed by a drying step to remove the solvent; this results in a continuous layer of dry electrode film, attached to a metal current collector. Considering that the final state of the electrode is a dried film of electrode materials on a metal current collector, the solvent of the slurry process is thus just the mediator for the 1) mixing and 2) binding processes involved, as its complete removal is required before an electrode can be used.

From an environmental standpoint, the slurry process is detrimental as it involves harmful solvents, such as N-methyl-pyrrolidone (NMP). In cases where NMP is involved, a solvent recycling facility is further required on top of the drying equipment to prevent NMP release into the environment. This translates to further additional costs for the slurry electrode fabrication process involving NMP or any other similar solvents.

Thus, there is a need in the art for a process for electrode fabrication which avoids slurries and does not involve solvents. A solventless process would be much more energy and cost efficient than the slurry process as it would circumvent the energy intensive required drying step to completely remove all the mediator solvent species.

A solventless electrode fabrication process can promote a greener supply chain for energy storage devices such as lithium ion batteries. Drying equipment occupies a large footprint; however, drying equipment would not be required in a solventless electrode fabrication process. Consequently, a solventless process requires a much smaller industrial footprint. This means not only is the solventless process efficient in terms of operating cost, it is also much easier to deploy at the industrial scale for new battery manufacturers or existing manufacturers seeking to increase production.

SUMMARY OF THE INVENTION

The disclosure is a method for the fabrication of lithium ion battery electrodes that does not require solvent, i.e., a solventless process for lithium ion battery electrode fabrication. The disclosure also relates to a dry cathode composition with optimized performance in terms of capacity loading, rate and cycling. The present invention is in contrast to the currently-used lithium ion battery electrode fabrication via a slurry coating process. In this slurry process, the electrode materials are dispersed in a solvent in the first step to create an electrode slurry. The slurry is then coated on metal current collectors, followed by a drying step to remove the solvent.

Considering that the desired final state of a battery electrode is in the form of a dried electrode film on a metal current collector, the solvent of the prior art slurry process is just a mediator for the 1) mixing and 2) binding processes involved; its complete removal is required before an electrode can be used. Consequently, a preferred process for electrode fabrication is one which does not involve a slurry and does not involve solvents, i.e., a solventless electrode fabrication process.

The present solventless electrode fabrication process is more energy and cost efficient and is also an inherently safer and more environmentally friendly process. The "dry electrodes", which result from the solventless electrode fabrication process present good performance in terms of rate capability and cycle life. Such performance is ascribed to 1) an even distribution of conductive carbon additive and binder species within a dry electrode structure and 2) a strong binding performance of the binder in the final electrode structure.

In one aspect, the present invention performs chemical modification is carried out on the active materials and the optional conductive carbon additives to increase surface affinity to the binder species. Doing so not only promotes a higher binding force between the particles and the binder, but also help stabilizes the dry particle mixture during the mixing step, leading to more uniform dispersion of the particles, and preventing the agglomeration that typically happens for optional additives such as conductive carbon particles. Further, the solventless electrode fabrication process is designed to operate above the binder melting point or the binder softening point. In this way, the binder is presented in a melt form/softened form at least during the final mixing step, which means that the polymer material can more fully expand to cover a greater binding area. As a result, a greater binding strength can be achieved when the binder is solidified or recrystallized as its temperature cools below the melting point.

A corollary is that when using a polymer melt binder system, less binder is required for binding the same materials as compared to the slurry system, as the slurry process utilizes binders only in a solution dispersed form. In a slurry, the solvent environment stabilizes the binder polymer chains, but does not provide sufficient energy to fully liberate the polymer chains from their intermolecular forces. Therefore, the solventless electrode fabrication process can allow a greater proportion of active material in the electrode mix for a higher energy density performance, achieving high capacity loading electrodes (mAh/cm2). For the case of slurry coated electrodes, a typical loading is 2-3 mAh/cm2, and capacity loading above 4 mAh/cm2 poses a challenge to achieve for the slurry process. This is due to 1) the difficulty of coating a thick wet film with high uniformity and 2) the surface instability of thick wet films which develop during the drying process meaning that cracks will easily form. Therefore, the fundamental feature of the slurry process limits its application for the fabrication of high capacity loading electrodes. In contrast, this limitation does not exist for the solventless electrode fabrication process.

In one aspect, the present invention provides a solventless method of making an electrode for an electrochemical cell. A solventless electrode material mixture includes 85-99% electrode active material and from 0-10% conductive carbon additive. A polymer binder system is present from 1-15%. The polymer binder system includes one or more polymer binders. The electrode material mixture is mixed at a temperature greater than a softening point or a melting point of at least one polymer binder of the polymer binder system. The electrode material mixture is kneaded into an electrode material dough. The electrode material dough is formed into an electrode material sheet. At least a portion of the electrode material sheet is affixed to a metal current collector to form an electrode.

In another aspect, the present invention provides a roller system and method that is specifically designed for the fabrication of lithium battery dry electrodes. In one aspect, the present invention provides a method of preparing a dry electrode layer for a lithium ion battery. A solventless electrode precursor dough is provided to a roller apparatus. The dough includes electrode active material particles and a binder system including at least one binder. The dough is heated to or maintained at a temperature above the melting point, or softening point, of at least one binder in the binder system. The solventless electrode precursor dough is rolled in the roller apparatus. The roller apparatus includes a roller having at least two-axis motion and positioning, including a horizontal axis and a vertical axis. A thickness of the solventless electrode precursor dough is reduced through rolling to create an active material layer. After cooling, the binder of the dough hardens, and a robust active material layer forms. The active material is combined with a current collector to create the dry electrode for a lithium ion battery.

DETAILED DESCRIPTION

Figure 1:
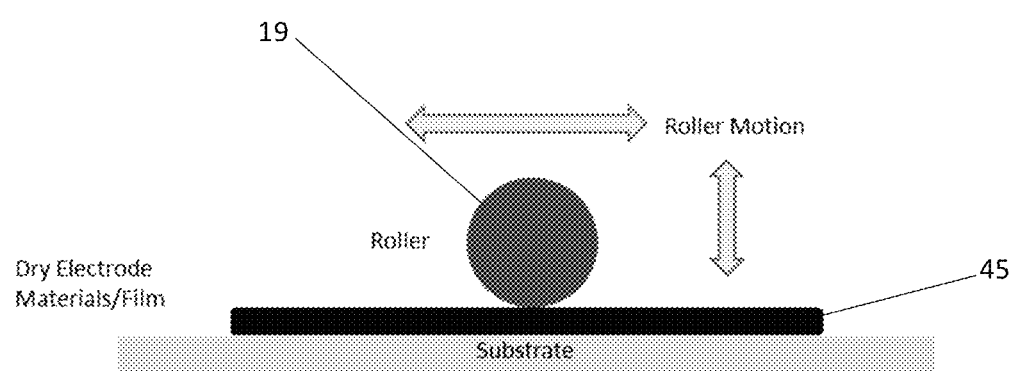
FIG. 1 is a schematic depiction of an embodiment of a solventless electrode fabrication process.

The present invention provides a method and apparatus for preparing a solventless, dry electrode layer for a lithium ion battery that overcomes the problems of the conventional solvent-based slurry fabrication techniques. A solventless electrode precursor dough is formed. The solventless electrode precursor dough includes electrode active material particles and a binder system including at least one binder. In one aspect, the dough includes 85-99% electrode active material particles, 0-10% conductive carbon additive, and 1-15% binder system. The dough may include positive electrode active material particles such as one or more of lithium cobalt oxide (LCO), lithium manganese oxide (LMO), lithium iron phosphate (LFP), lithium nickel manganese cobalt oxide (e.g., NMC and NMC532), nickel rich lithium nickel manganese cobalt oxide (e.g., NMC622 and NMC811), lithium nickel cobalt aluminum oxide (NCA), lithium nickel manganese oxide (LNMO), lithium manganese phosphate ($LiMnPO_4$), lithium cobalt phosphate ($LiCoPO_4$), or lithium vanadium phosphate (LVP). Alternatively, the dough may include negative electrode active material particles such as graphite, hard carbon, soft carbon, silicon-carbon composite, silicon oxide-carbon composite, sulfur-carbon composite, lithium titanium oxide (LTO).

The binder system includes one or more of polyvinylidene difluoride (PVDF), poly(vinylidene fluoride-co-hexafluoropropylene) (PVDF-HFP), polytetrafluoroethylene (PTFE), polyvinylfluoride (PVF), polyethylene (PE), polypropylene (PP), polyethylene oxide (PEO), polyethylene vinyl acetate (PEVA), polyurethane (PU), polypropylene rubber (PPR), ethylene propylene rubber (EPR), styrene butadiene rubber (SBR), styrene-ethylene-butylene-styrene rubber (SEBS), acrylonitrile butadiene styrene rubber (ABS), polyisobutylene (PIB), polyvinyl alcohol (PVA), phenoxy resin, polyethylene terephthalate (PET), nylon, polymethylmethacrylate (PMMA), polyvinyl chloride (PVC), polyphenylene sulfide (PPS), polystyrene (PS), pitch, tar, asphalt, or bitumen. When multiple binders are used, the melting point and softening point of each binder in the binder system may be the same or different.

The optional carbon additive may be one or more of C65 carbon black, C45 carbon black, super P carbon black, acetylene black, ketjenblack carbon black, carbon nanotubes, graphene, carbon nanofibers, carbon fibers.

A dough-like texture of the above materials is formed. This dough-like texture results from a high temperature kneading process to which the special dry electrode material mixture is subjected. The kneading process affords the special dry electrode material mixture good dispersion and binding, which is manifested in the uniform dough texture of the material. In some embodiments, the mixing step may comprise at least one selected from the group of acoustic mixing, ball milling, blending, two roll milling, kneading, grinding, shear mixing.

During mixing, the dough is either heated to or maintained at a temperature approximately at or above the melting point or softening point of at least one binder in the binder system. For example, the dough may be heated to a temperature of approximately 100 to 200° C. The thermal energy for the heat may come from heat used to create the active material particles, as will be further described below. The formed active material layer, which may have a thickness of 2.0 mm or less, typically between 0.05 mm and 2 mm, is joined with a current collector to create the dry electrode for a lithium ion battery.

The current collector may be, for a positive electrode, one or more of aluminum foil, primer coated aluminum foil, nickel foil, primer coated nickel foil, titanium foil, and primer coated titanium foil. A negative electrode metal current collector may be selected from one or more of aluminum foil, primer coated aluminum foil, copper foil, primer coated copper foil, titanium foil, and primer coated titanium foil.

The "dry electrodes", which result from the solventless electrode fabrication process demonstrate good performance characteristics in terms of rate capability and cycle life. Such performance is ascribed to 1) an even distribution of the optional conductive carbon additives and binder species within a dry electrode structure and 2) a strong binding performance of the binder in the final electrode structure, both of which are achieved through the solventless electrode fabrication process. Since the solventless electrode fabrication process is designed to operate above a binder melting point or softening point in the binder system, the polymer material can be fully expanded to cover a greater binding area. The result of using a molten or softened binder is that greater binding strength can be achieved when the binder is hardened or recrystallized as the temperature cools below the melting point. A corollary is that using a polymer melt binder system, less binder is required for binding the same materials as compared to the slurry system, as the slurry process utilizes a binder only in a solution-dispersed form. In the slurry system, the solvent environment stabilizes the binder polymer chains, but does not provide sufficient energy to fully liberate the polymer chains from their intermolecular forces. Therefore, the solventless electrode fabrication process can allow a greater proportion of active material in the electrode mix for higher energy density performance.

In one embodiment, chemical modification may be carried out on the active materials and the optional conductive carbon additives to increase surface affinity to the binder species. Doing so not only promote a higher binding force between the particles and the binder, but also help stabilizes the dry particle mixture during the mixing step, leading to more uniform dispersion of the particles, and preventing that agglomeration that typically happens for the conductive carbon particles. For example, treatment with suitable silane coupling agents creates a chemically coupled active material-conductive carbon structure for the solventless process. The result is a strong chemically bonded active material-conductive carbon structure which further promotes a high binding force with the binder in the final electrode forming step.

The silane coupling agent may be selected from one or more of vinyltrimethoxysilane, aminopropyltrimethoxysilane, 3-glycidyloxypropyltrimethoxysilane, p-styryltrimethoxysilane, 3-methacryloxypropyltrimethoxysilane, acryloxypropyltrimethoxysilane, 3-isocyanatepropyltriethoxysilane, mercaptopropyltrimethoxysilane, vinyltriethoxysilane, 3-glycidyloxypropyltriethoxysilane, 3-methacryloxypropyltriethoxysilane, aminopropyltriethoxysilane or a combination thereof.

In one process, both the electrode active material and the conductive carbon additive may be treated with silane coupling agents to create a novel electrode structure. The method may include a first reaction, where the active material is modified with a first type of silane coupling agent and a second reaction, the conductive carbon is modified with a second type of silane coupling agent. In a third reaction, the modified active material from the first reaction is reacted with the modified conductive carbon from the second reaction, wherein the first type of silane coupling agent and the second type of silane coupling agent result in a chemical coupling between the modified active material and the modified conductive carbon.

The first type of silane coupling agent may selected from one or more of vinyltrimethoxysilane, aminopropyltrimethoxysilane, vinyltriethoxysilane, and aminopropyltriethoxysilane. The second type of silane coupling agent is selected from one or more of 3-isocyanatepropyltriethoxysilane, mercaptopropyltrimethoxysilane, and 3-glycidyloxypropyltriethoxysilane.

The fabrication of dry electrodes for lithium ion battery requires making significant changes to the material formulation in order to ensure a comparable performance to slurry coated electrodes. At the same time, the development of a complementary mechanical process for the dry electrode materials handling is also necessary, to maintain a workable path for further development into large scale manufacturing practice.

This electrode material dough requires spreading and thinning out to form a thinner sheet or film, for achieving an electrode of practical area and capacity. A suitable mechanical process is necessary for this spreading and thinning out step. It was determined that the preferred mechanical process uses a roller system against the electrode material dough on a rigid, flat and non-stick substrate. Additionally, a heating function can be enabled on the roller or the substrate, or both, Therefore, the present invention, in one aspect, also provides a roller system that is uniquely designed for the rolling of dry electrode materials from a thick slab/dough to a thickness suitable for use in a battery. This roller design takes into account the unique properties of dry electrode materials, and as a result is a specialized design for dry electrode fabrication. The advantage of this roller design is therefore its complementary attributes toward the dry electrode materials and that it is necessary for the further development of dry electrode, focusing on manufacturability. The present roller design specifically addresses the unique dry electrode material properties, in order to create a thin sheet of dry electrode from a thicker slab/dough of the same dry electrode materials.

The roller apparatus, may have a roller with at least two-axis motion and positioning, including a horizontal axis and a vertical axis. The roller reduces a thickness of the solventless electrode precursor dough through rolling to create an active material layer. A vertical positioning of the roller determines a final thickness of the active material layer. A pressure loading to effect a thickness reduction of the solventless electrode precursor dough is greater than 3 kg per cm width of the active material layer being formed. In one embodiment, the roller is operated horizontally at a speed greater than 1 cm per second, in order to effect the thinning/spreading out of the solventless electrode precursor dough.

The roller apparatus platen may be supported by springs to balance the roller and to protect the solventless electrode precursor dough from excessive rolling pressure. To this end, a pressure sensing function may be enabled on a substrate for the monitoring of rolling pressure.

A schematic depiction of a roller mechanism and method for rolling of a solventless dough-like electrode material mixture 45 is depicted in FIG. 1. In the embodiment shown in FIG. 1 only a single roller 19 is required, against the dry electrode material 45 on a substrate that has a non-stick surface and is rigid. Attempts to roll the material through a typical battery electrode calendar which comprises two rollers results in broken films. Rolling the electrode material dough with a single roller system affords the electrode film additional freedom to spread and thin out during the rolling process. In contrast, a two-roller calendar system has a drawing effect, which continuously draws materials toward it. As a result, the material going through the calendar has less space to spread and for the stresses generated to redistribute. Therefore, a single roller system was found to produce the desired effect for electrode material rolling.

The roller design can be easily materialized on a 3D printer framework. Where a roller is fixed on the 3D printer head through an appropriate holder, thus the roller position can be easily controlled through a XYZ position controller which accompanies a typical 3D printer. However, considering the needs of the solventless electrode process, only a two dimensional movement is required. The vertical motion is for the positioning of the roller and increasing pressing force, and a horizontal motion is for driving the roller operation. Thus, only a 2D motion, or XZ position controller is required. To supply the pressing force required during roller operation and maintaining positional accuracy, the motion of this roller design is supplied by two series of high torque stepper motors with screw and nut slider. In this design, the horizontally moving part and mechanism is entirely hosted on a platform that is vertically moving. In this way, the support structure for the vertically moving platform can be easily reinforced to bear the weight of the platform, and further to support the load generating structure for the roller operation.

As the roller is fixed on a rigid holder on the horizontally moving part, during operation of the roller, stability is maintained by using a set of balancing springs underneath the substrate which the electrode rolling takes place. These springs not only help balance the roller, but can also act as a shock absorber to relief excessive stress when the pressure load potentially far exceed the strength of the electrode material. In this manner, the springs also offer some protection to the electrode film from being broken by the rolling process.

For an effective rolling of a dry electrode material dough to achieve the final electrode film which has the desired properties, it has been experimentally determined that a certain pressure load is required for the rolling process. The required pressure loading to effect a thickness reduction on the electrode film is greater than 3 kg per cm width of the electrode film. When an insufficient pressure is loaded during the rolling, the electrode film therefore does not spread. Too great a pressure loaded during the rolling will easily cause the film to break. Therefore, a suitable magnitude of order for the pressure loading is approximately 3 kg to 30 kg per cm width of the electrode film. The roller of this invention meets this mechanical rolling force requirement and additionally a pressure sensor is enabled in this design for force monitoring.

Besides the rolling pressure, a complementary rolling speed is also required for the effective rolling of good electrode films. It has been experimentally determined that a rolling speed greater than 1 cm per second is required to effect the thinning/spreading out of the electrode. When a lower rolling speed is applied, it does not effect a sufficient shearing on the electrode film, as a result the electrode film does not spread out. Too great a rolling speed means that the film under rolling do not have sufficient allowance in time and space to spread. Therefore, a suitable magnitude of order for the rolling speed is approximately 1 cm to 10 cm per second.

Using a heated roller or substrate further supplements the thickness reduction process as raising temperature effect a softening of the polymer binder species, which affords the electrode film greater ability to spread. However, using too high a temperature can overcome the melting point of the binder, resulting in the film unable to hold a stable structure. Furthermore, the electrode active materials may also become damaged when too high a temperature is applied. Therefore, a temperature of 100-200° C. is used for this purpose.

Figure 2:
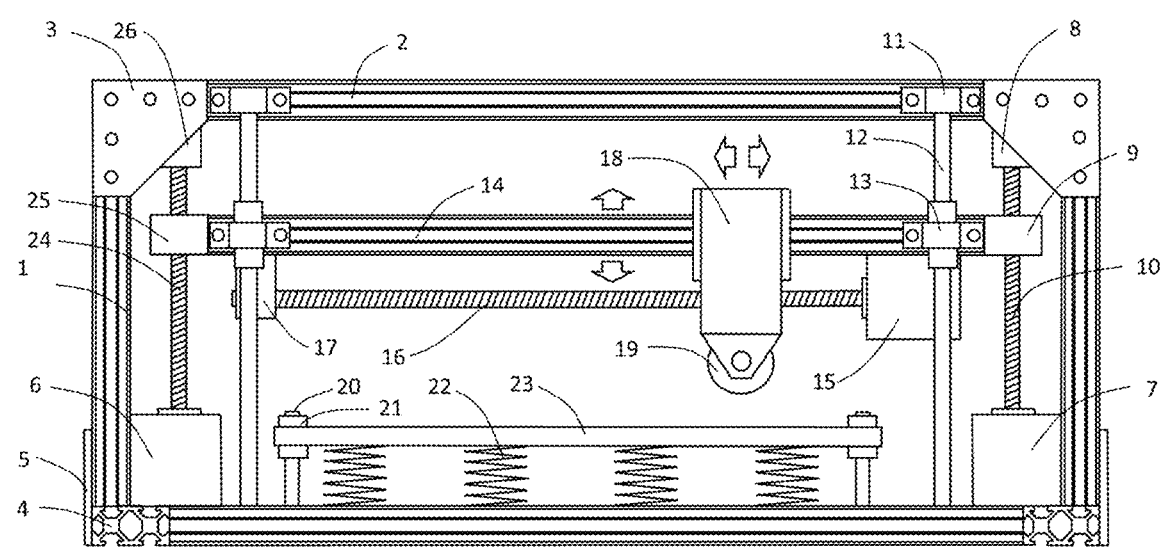
FIG. 2 is a side view of an apparatus for performing the solventless electrode fabrication process of FIG. 1.
Figure 3:
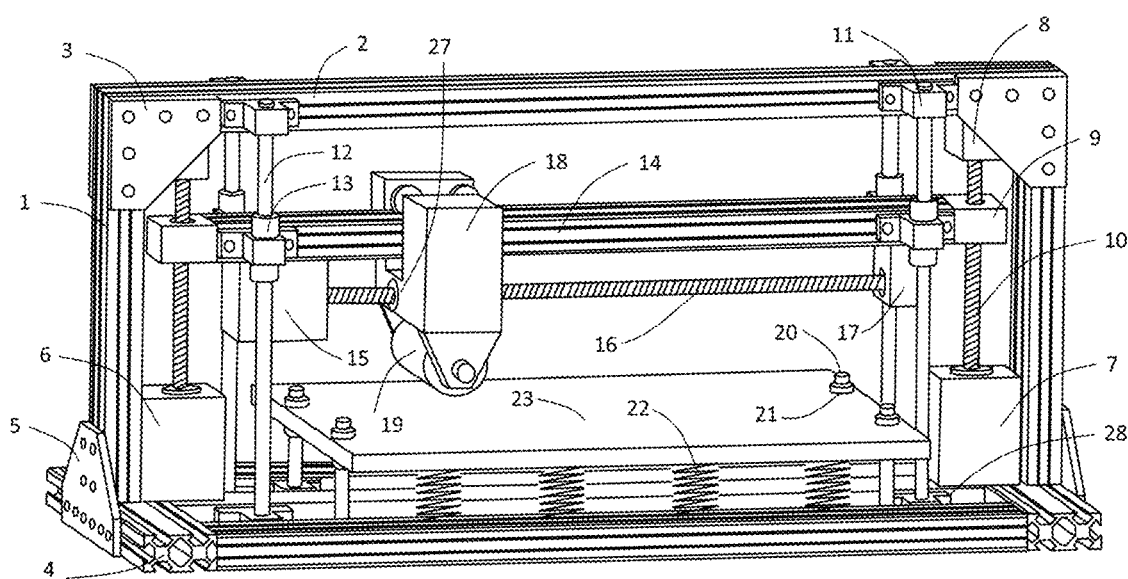
FIG. 3 is a perspective view of an apparatus for performing the solventless electrode fabrication process of FIG. 1.

An example construction of the roller apparatus is shown in FIG. 2 (side view) and FIG. 3 (perspective view). In this embodiment, the roller system is hosted in a 3D printer framework but it is understood that the roller system can be applied in commercial-scale roller apparatus.

In this example, the base apparatus support structure includes support elements 1, 2, 3, 4 and 5 in FIGS. 2 and 3. Support elements 1, 2, and 4 are 2040 size aluminum extrusions; these materials can provide a strong structure for levelling of the roller and for supporting horizontal movement. The aluminum extrusions are joined together by triangle plates 3 and 5.

Figures 4A, 4B:
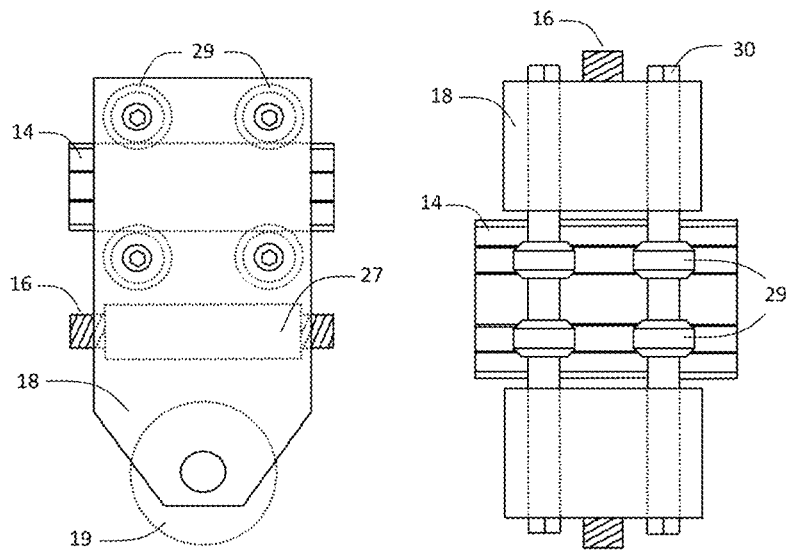
FIGS. 4A-4B show side and top views of a roller portion of the apparatus of FIG. 3.

The roller is labelled 19 in FIGS. 2, 3, and 4A. The roller can be fabricated from aluminum, stainless steel, copper, or other metals. Optionally, the roller may be coated with a non-stick layer. The roller may include with a heating element (e.g., a resistive heater) for heating to a temperature in a range from 100-200° C. for facilitating the rolling process.

A positioner governs the spatial movement of the roller 19 in the X-Z direction. Its primary components include stepper motors 6, 7, 15, screw rods 10, 16, 24, screw nuts 9, 25, 27, and flange bearings 8, 17, 26. Four sets of linear rail support guides are built from bearing 13, cylinder linear rail 12 and rail holders 11 and 28, for alignment and supporting the vertical moving structure, which includes the horizontal aluminum extrusion 14 on which the roller is mounted.

The vertical direction motion is provided by stepper motors 6 and 7, screw rods 10 and 24, screw nuts 9 and 25, and flange bearings 8 and 26. The horizontal motion is provided by stepper motor 15, screw rod 16, screw nut 27 and flange bearing 17. The roller 19 is connected to the horizontal moving feature through a holder 18, in which the screw nut 27 and other features are also embedded and will be described further below.

The substrate/platen is a rectangular aluminum plate 23. Optionally the substrate/platen has a heating element embedded therein to provide a heating feature, and further includes an embedded thermocouple and pressure array sensors for substrate temperature and pressure monitoring. Platen 23 may include a non-stick coating such as PTFE or other materials.

The roller balancing and also substrate/platen horizontal leveling is maintained by a set of springs 22 installed under the substrate 23. These springs help balance the roller and substrate and act as a shock absorber to relieve excessive stress. Four sets of linear rail support guide are built from bearings 21 and cylinder rails 20 on the substrate corners to support and balance the substrate during roller operation.

The roller holder 18 is shown in greater detail in FIGS. 4A-4B. These FIGS. show that roller holder 18 further contains four rubber wheels 29 for moving on the groove of aluminum extrusion 14. The rubber wheels 29 are fixed on the holder 18 through fixture 30. This construction ensures that the roller have a stable horizontal motion across the aluminum extrusion 14, when it is operated with a high downward pressure.

EXAMPLE

Figure 5:
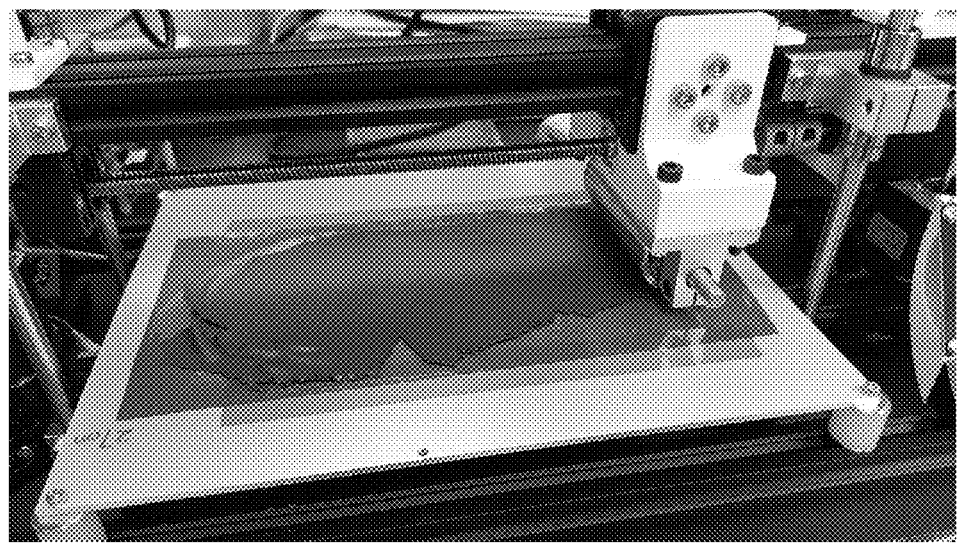
FIG. 5 depicts an as-formed solventless negative electrode from the apparatus of FIG. 2.

The system of FIGS. 2-4 was used to fabricate a dry electrode. In this example, a polyimide film was used as the non-stick layer and to protect the platen surface from contamination by the electrode materials. Using removable substrate covers, the system can readily fabricate both cathode and anode materials with the same roller system, avoiding cross-contaminating issues, given that the polyimide film is replaced each time a different material is used. The roller surface was easily cleaned between experiments and need not be replaced for different electrode materials. The electrode material shown in FIG. 5 is graphite based, and is further laminated on copper foil for using as the negative electrode in a lithium ion battery.

Figure 6:
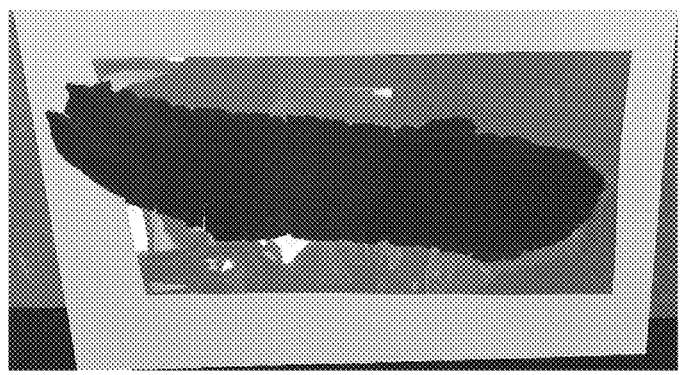
FIG. 6 depicts an as-formed solventless positive electrode from the apparatus of FIG. 2.

A challenge for using electrode materials such as lithium iron phosphate (LFP) concerns the difficulty of developing high area capacity electrodes of good quality. It is recognized that this shortcoming can be overcome by adopting the dry electrode method for LFP electrode fabrication. An example of dry LFP electrode fabricated using the dry method and together with the roller is shown in FIG. 6. Upon further lamination on aluminum foils, the LFP electrode is thereafter used as the positive electrode in a lithium ion battery.

Figure 7:
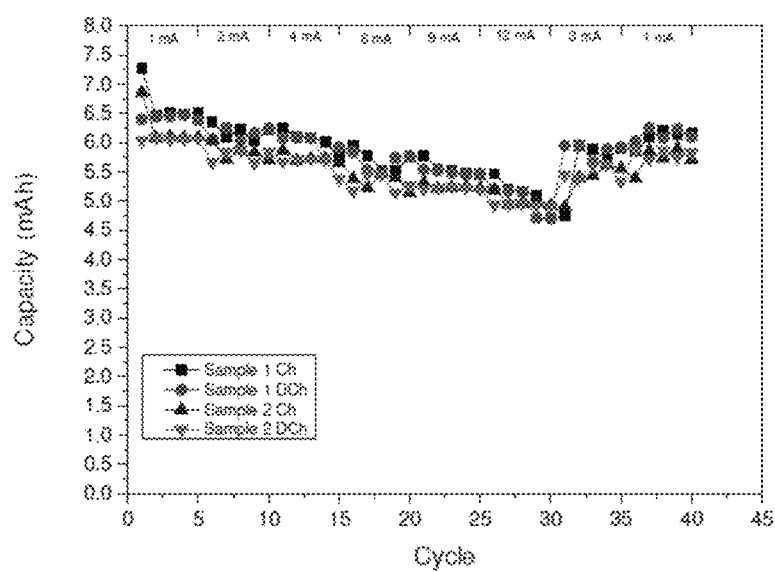
FIG. 7 shows the rate performance test of a sample positive electrode.

Battery Property Testing:

FIG. 7 shows the rate performance test of a sample positive electrode based on NMC111 in a full lithium metal battery, in which the active material percentage was 94%. The capacity loading was 5.65 mAh/cm$^2$ for Sample 1 and for Sample 2 was 5.3 mAh/cm$^2$. The rate test was carried out using a charging current of 1 mA (0.88 mA/cm$^2$) to a voltage of 4.2 V, and then discharged using different currents, as indicated on the graph, to a voltage of 3 V. When discharged at 12 mA (10.6 mA/cm2), corresponding to an average C-rate of 2C for the two batteries, the capacity retention was approximately 80% of the capacity accessed when discharged at 1 mA (0.88 mA/cm2), which roughly corresponds to a C-rate of 0.17C.

Figure 8:
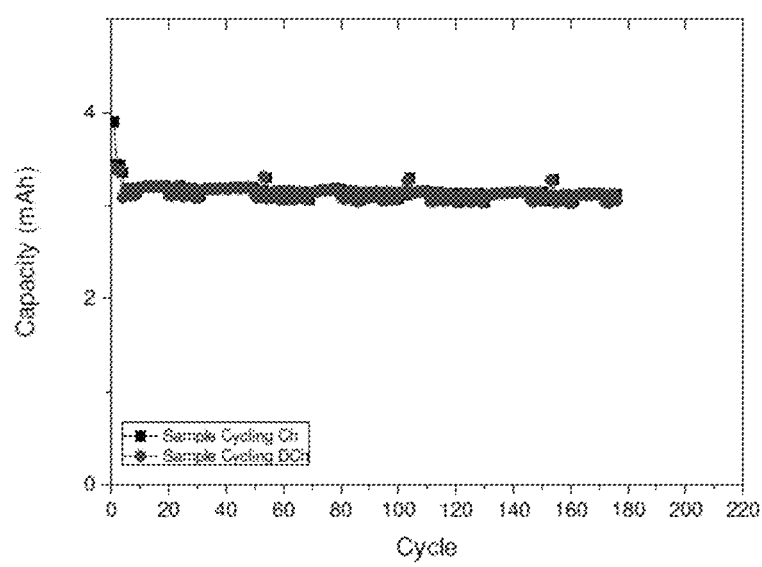
FIG. 8 shows a cycling performance test of a sample positive electrode based on NMC 111 in a full lithium metal battery.

FIG. 8 shows a cycling performance test of a sample positive electrode based on NMC 111 in a full lithium metal battery, in which the active material percentage was 92%. The capacity loading of this positive electrode was approximately 3 mAh/cm$^2$. The thickness of the initially free standing positive electrode prior to the lamination was approximately 100 microns. The cycling test was carried out first with 3 cycles of conditioning at 0.1C/0.1 C, charging to 4.2 V and discharging to 3.0 V. Subsequently the battery was cycled at a rate of 0.2 C charging to 4.2 V and 0.5 C discharging to 3.0 V, and after every 49 cycles of such cycling, a slow cycle of 0.2 C/0.2 C charge and discharge is carried out to determine the low current capacity. This battery shows only 3% degradation after 170 cycles. Very importantly, this test shows that a very thin, approximately 100 microns positive electrode film having approximately 3 mAh/cm$^2$ capacity, that was rolled from an initially much thicker electrode "dough", of several millimeters thick, still preserves the same robust structure and has very stable performance. This further shows that the electrode "dough", produced from this solventless electrode fabrication process, allows easy fabrication of electrodes according to any required thickness or capacity loading.

An electrode was fabricated having a current collector, an electrode having from 90-98% active material, from 2-8% conductive carbon additive and from 2-8% polymer binder system. At a capacity loading greater than 5 mAh/cm$^2$, when discharged using 2 C current, the electrode retains greater than 75% of its capacity; when discharged using a 0.2 C current, the electrode retains greater than 80% of the original capacity after 300 cycles.

INDUSTRIAL APPLICABILITY

The solventless electrode fabrication process of the present invention may be integrated directly with the active material manufacturing process. For example, the positive electrode material manufacturing process begins with wet mixing of lithium salts and transition metal salts. Then, the salt mixture is dried and subjected to sintering at temperatures typically greater than 800° C., for the formation of the partially lithiated transition metal oxide compounds, which is the final, active positive electrode material composition. After the sintering is completed, the final product is cooled to ambient temperature for further processing, such as slurry making for coating of electrodes in the conventional technique.

However, during the cooling phase of the positive electrode material, the present invention may directly utilize the waste heat from 200° C. to ambient for the electrode fabrication process. As a result, with this integrated process, direct fabrication of electrodes may be carried out utilizing the waste heat from the original active material manufacturing process, thereby achieving a greater energy efficiency for both the active material manufacturing process and also the solventless electrode fabrication process.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method of preparing a dry electrode layer for a lithium ion battery comprising:
   providing a solventless electrode precursor dough to a roller apparatus including electrode active material particles and a binder system including at least one binder, the dough being heated to at a temperature above the melting point of at least one binder of the binder system;
   rolling the solventless electrode precursor dough in the roller apparatus, the roller apparatus including a roller and having at least two-axis motion and positioning, including a horizontal axis and a vertical axis;
   reducing a thickness of the solventless electrode precursor dough with the roller to create an active material layer;
   combining the active material layer with a current collector to create the dry electrode for a lithium ion battery.

2. The method of claim 1, wherein the roller is heated to a temperature of 100 to 200° C.

3. The method of claim 1, wherein the dough is supported in the roller apparatus by a heated, non-stick platen.

4. The method of claim 1, wherein the solventless electrode precursor dough includes 90-99% electrode active material particles, 0-10% conductive carbon additive, and 1-15% binder system.

5. The method of claim 4, wherein the electrode active material particles and/or conductive carbon additive are chemically modified with a silane coupling agent to effect a dry binding enhancement.

6. The method of claim 1, wherein the electrode active material particles are positive electrode active material particles selected from one or more of lithium cobalt oxide (LCO), lithium manganese oxide (LMO), lithium iron phosphate (LFP), lithium nickel manganese cobalt oxide, nickel rich lithium nickel manganese cobalt oxide, lithium nickel cobalt aluminum oxide (NCA), lithium nickel manganese oxide (LNMO), lithium manganese phosphate (LiMnPO$_4$), lithium cobalt phosphate (LiCoPO$_4$), or lithium vanadium phosphate (LVP).

7. The method of claim 1, wherein the electrode active material particles are negative electrode active material particles selected from one or more of graphite, hard carbon, soft carbon, silicon-carbon composite, silicon oxide-carbon composite, sulfur-carbon composite, lithium titanium oxide (LTO).

8. The method of claim 1, wherein the binder system includes one or more of polyvinylidene difluoride (PVDF), poly(vinylidene fluoride-co-hexafluoropropylene) (PVDF-HFP), polytetrafluoroethylene (PTFE), polyvinylfluoride (PVF), polyethylene (PE), polypropylene (PP), polyethylene oxide (PEO), polyethylene vinyl acetate (PEVA), polyurethane (PU), polypropylene rubber (PPR), ethylene propylene rubber (EPR), styrene butadiene rubber (SBR), styrene-ethylene-butylene-styrene rubber (SEBS), acrylonitrile butadiene styrene rubber (ABS), polyisobutylene (PIB), polyvinyl alcohol (PVA), phenoxy resin, polyethylene terephthalate (PET), nylon, polymethylmethacrylate (PMMA), polyvinyl chloride (PVC), polyphenylene sulfide (PPS), polystyrene (PS), pitch, tar, asphalt, or bitumen.

9. The method of claim 1, further comprising a conductive carbon additive in an amount of approximately 10% or less wherein the conductive carbon additive is selected from one or more of carbon black, carbon nanotubes, graphene, carbon nanofibers, carbon fibers.

10. The method of claim 1, wherein a final thickness of the active material layer is 0.05 mm to 2 mm.

\* \* \* \* \*